Nov. 17, 1970 S. A. LOUKOMSKY 3,540,930
PRODUCTION OF NEGATIVE ELECTRODES FOR NICKEL-CADMIUM BATTERIES
Filed Nov. 19, 1968 3 Sheets-Sheet 1
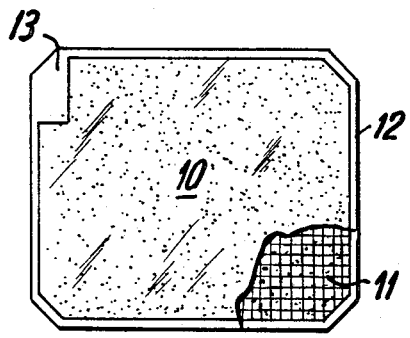
FIG.1
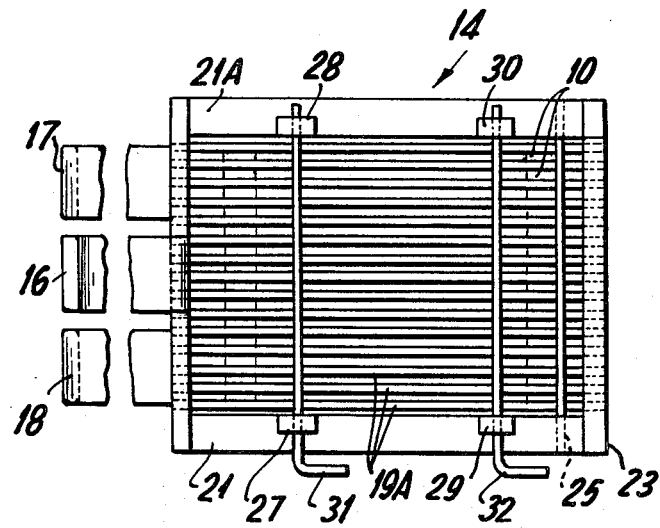
FIG.4
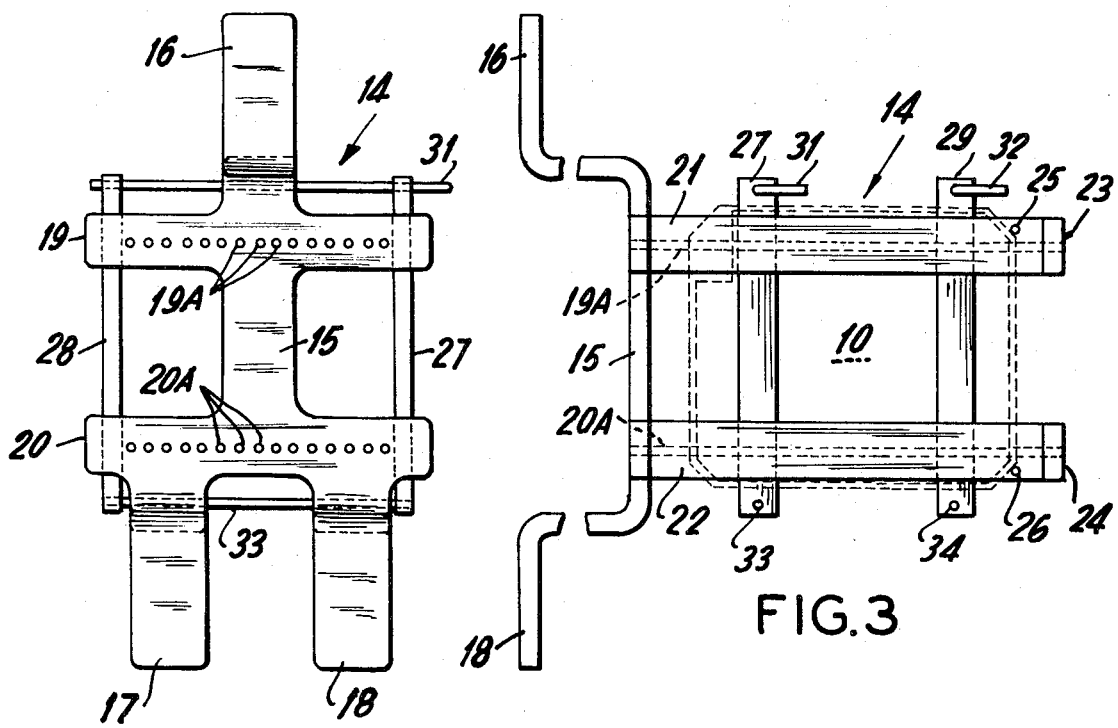
FIG.2
FIG.3
INVENTOR.
SERGE A. LOUKOMSKY
BY
Hopgood & Calimafde
ATTORNEYS Nov. 17, 1970     S. A. LOUKOMSKY     3,540,930
PRODUCTION OF NEGATIVE ELECTRODES FOR NICKEL-CADMIUM BATTERIES
Filed Nov. 19, 1968     3 Sheets-Sheet 2

INVENTOR.
SERGE A. LOUKOMSKY
BY
Hopgood & Calimafde
ATTORNEYS

Nov. 17, 1970 S. A. LOUKOMSKY 3,540,930
PRODUCTION OF NEGATIVE ELECTRODES FOR NICKEL-CADMIUM BATTERIES
Filed Nov. 19, 1968 3 Sheets-Sheet 3

INVENTOR.
SERGE A. LOUKOMSKY
BY
Hopgood & Calimafde
ATTORNEYS

United States Patent Office 3,540,930
Patented Nov. 17, 1970

3,540,930
PRODUCTION OF NEGATIVE ELECTRODES
FOR NICKEL-CADMIUM BATTERIES
Serge A. Loukomsky, Sea Cliff, N.Y., assignor to Battery Development Corporation, New York, N.Y., a corporation of Delaware
Filed Nov. 19, 1968, Ser. No. 777,022
Int. Cl. H01m 43/04
U.S. Cl. 136—24
14 Claims

ABSTRACT OF THE DISCLOSURE

A method is provided for producing improved negative electrodes for use in nickel-cadmium batteries comprising immersing a sintered porous nickel plaque in a hot aqueous solution of cadmium nitrate containing a wetting agent, which solution at ambient temperature is unsaturated, whereby to impregnate the plaque with the solution. Following impregnation, the paque is removed from the solution and dried below the temperature at which the hydrated cadmium nitrate melts, following which the dried plaque is rapidly immersed in an alkaline solution containing up to about 50% by weight, e.g., 20% to 35%, of an alkali metal hydroxide such as potassium hydroxide, to convert the cadmium nitrate to cadmium hydroxide. Depending up on the amount of active material desired in the electrode, the foregoing steps may be repeated until the desired amount is obtained.

---

This invention relates to the production of negative electrodes for nickel-cadmium batteries and, in particular, to a method of producing negative electrodes characterized by high porosity and optimum discharge characteristics.

It is known to produce porous negative electrodes containing cadmium hydroxide by utilizing sintered nickel plaques of relatively high porosity as the support for the cadmium hydroxide. The porous plaques are produced by sintering carbonyl nickel powder of low apparent density to obtain porosities ranging from about 60% to 90%, for example, 75% to 85%. One method in producing the plaque is to place a layer of carbonyl nickel powder on both sides of a nickel screen in a graphite mold and sintering the powder in a non-oxidizing atmosphere under elevated temperature and molding pressure, the pressure applied by a graphite cover usually beig sufficient. It is desirable to maintain the plaque at as high a porosity as possible consistent with good mechanical strength. The porous nickel plaque is then used in the well known manner to produce an electrode by impregnating the pores with a cadmium salt solution and the cadmium salt then converted to cadmium hydroxide in situ.

A variety of methods have been proposed in producing electrodes of the foregoing type, such as positive nickel electrodes. For example, in U.S. Pat. No. 2,708,212, porous nickel electrodes are produced by impregnating the pores with an aqueous nickel nitrate solution under vacuum, the solution being almost saturated at a temperature of about 20° C. to 30° C. Following impregnation, the plaque is then subjected to a cathodic electrolytic process in a heated bath of alkali metal hydroxide for converting the nickel nitrate to the desired active positive electrode material (nickel hydroxide). The electrolyzing bath, containing about 20% sodium hydroxide, is kept near the boiling point, such as 100° C. to 110° C. Similar methods have been employed for producing cadmium-containing negative electrodes.

As to other methods which have been proposed, the impregnation process is usually similar to that described above, followed by drying and subsequent conversion of hydrated cadmium nitrate to hydroxide by dipping in an alkaline solution. In Pat. No. 3,248,266, for example, the porous nickel plaque is immersed in a solution comprising cadmium nitrate dissolved in an organic solvent e.g., methyl alcohol, after which the matrix is removed, dried at a temperature of about 50° C. to 200° C. and thereafter immersed in a 25% to 35% caustic solution and the hydrated cadmium nitrate cathodically converted to cadmium hydroxide. The cycle is repeated until a sufficient increase in weight is obtained of at least 15% over the original weight of the plaque.

As the pores fill up with cadmium hydroxide, the porosity of the plaque decreases. While this is to be expected, the porosity should not be allowed to fall to such a low value that the battery electrolyte is unable to permeate the electrode uniformly throughout. Depending upon the physical characteristics of the cadmium hyroxide precipitated in the pores, the porosity may be adversely affected even before the desired filling of the pores obtains. Apparently, two factors have been overlooked by the prior art in this regard which have a marked effect on obtaining the desired porosity in the final electrode structure.

One factor is the importance of maintaining the physical characteristics of the hydrated cadmium nitrate in the pores in a condition which conduces to the formation of porous active material during conversion from hydrated cadmium nitrate to cadmium hydroxide. The other important factor is the necessity of avoiding a condition from occurring in the pores which impedes the desired amount of caustic solution from permeating the pores throughout, so that not all of the cadmium nitrate is converted into cadmium hydroxide essentially at once. When a cadmium nitrate impregnated plaque is immersed in a caustic solution, such as an aqueous potassium hydroxide solution, so long as the amount of potassium hydroxide available exceeds what is needed to convert all of the cadmium nitrate to hydroxide, the process can be carried out without an adverse effect on porosity; whereas, if too little potassium hydroxide is present, the electrode porosity is generally reduced.

Tests have indicated, with regard to potassium hydroxide concentration, that concentrations as high as 50% can be employed without adverse effects.

It would be desirable to avoid the foregoing difficulties and to provide a simple combination of operational steps conducive to automatic operation and requiring minimum handling of individual plaques. Such an operation would be commercially feasible by avoiding the use of vacuum impregnation, by avoiding the use of the method of cathodically converting the cadmium nitrate to cadmium hydroxide, and by avoiding the use of special solvents, such as organic solvents.

I have found that I can avoid the difficulties of the prior art and provide improved electrodes which exhibit optimum electrode properties, such as improved discharge characteristics.

It is thus the object of the invention to provide a method of producing cadmium hydroxide impregnated nickel electrodes which exhibit high porosity coupled with improved discharge characteristics.

Another object is to provide the mechanical stabilization of the porous cadmium hydroxide in the electrodes to prevent its exudation out of the electrodes under conditions of use.

Another object is to provide a method of producing high quality cadmium hydroxide impregnated porous nickel electrodes without using vacuum impregnation and/or cathodic electrolytic treatment for converting the cadmium nitrate to cadmium hydroxide.

A still another object is to provide a combination of operational steps for producing improved negative electrodes capable of being carried out on a production basis with substantially no handling between steps, which steps are capable of being automated.

These and other objects will more clearly appear from the following disclosure and the appended drawings, wherein:

FIG. 1 is illustrative of a porous electrode plaque produced from sintered carbonyl nickel powder;

FIGS. 2 to 4 depict one embodiment of an electrode carrier assembly employed in carrying out the process of the invention;

Figure 5:
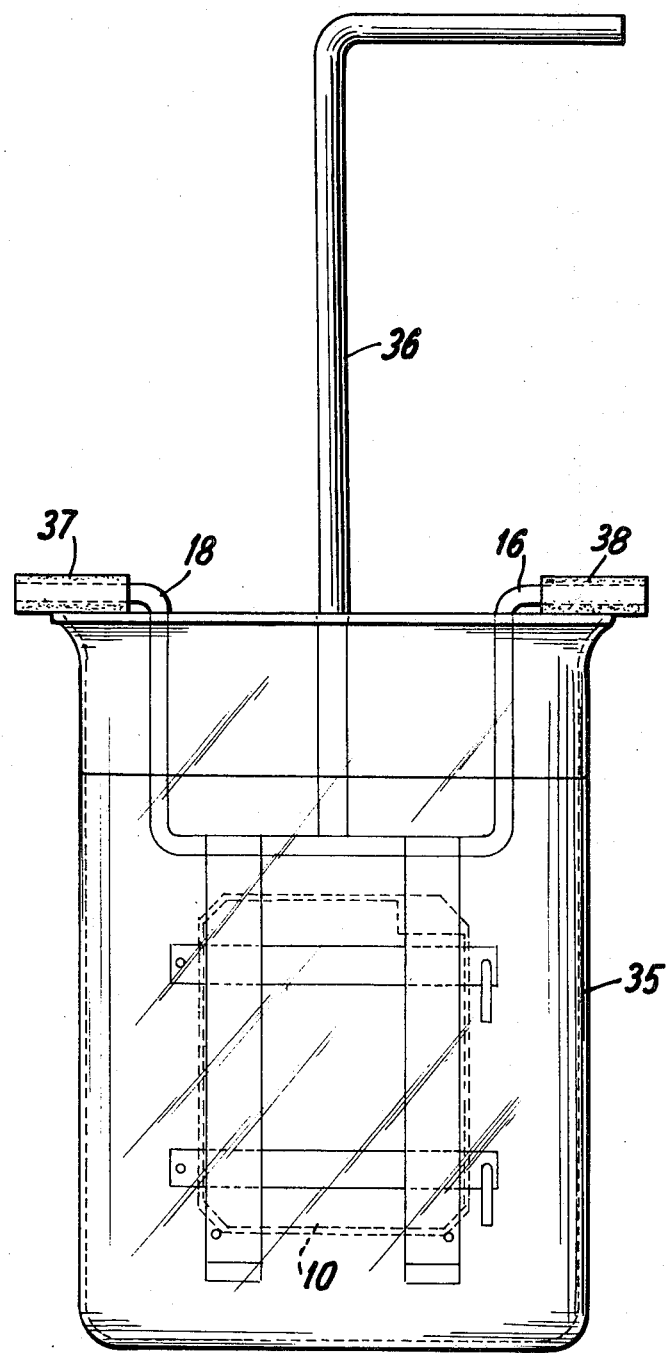
FIG. 5 shows the electrode carrier loaded with the electrode blanks of FIG. 1 immersed in a beaker of solution.

I have found in carrying out my invention that in order to assure the desired form of cadmium hydroxide in the pores of the sintered nickel plaque and avoid regions of too low a porosity after conversion of the hydrated nitrate salt, it is important that the impregnated hydrated cadmium nitrate be prevented from melting during any one of the processing steps. It has been observed that if the nitrate salt in the pores is allowed to melt before the salt is converted to cadmium hydroxide, the physical form of the cadmium hydroxide which forms after conversion is adversely affected. Another observation made is that if too little caustic solution is absorbed in the pores, some unreacted cadmium nitrate remains in the pores which subsequently tends to redissolve and be precipitated as hydroxide in undesirable locations. By assuring that the hydrated cadmium nitrate does not melt during processing (melting point about 59.5° C.), it maintains its porous structure and enables the absorption of optimum amount of potassium hydroxide solution and, hence, assures substantially complete conversion of the salt to cadmium hydroxide.

It appears that if the impregnated plaque is heated to a drying temperature above the melting point of the hydrated cadmium nitrate, for example 65° to 70° C. or above, so that the hydrated nitrate in the pores melts, the cadmium hydroxide ultimately precipitated by dipping the plaque in a potassium hydroxide solution tends to comprise hard aggregates covered with relatively impervious films which tend to retard diffusion of the electrolyte into the resulting porous electrode. Thus, by controlling the concentration of the cadmium nitrate solution and by drying the impregnated plaque at a temperature below the melting point of the hydrated nitrate salt, the foregoing difficulties are avoided.

Instead of using cadmium nitrate solution which is substantially saturated at room temperature, I have found it advantageous to keep the room temperautre concentration at below saturation (saturation being about 58% to 60% by weight of hydrated cadmium nitrate), for example, up to about 90 or 95% of saturation, such as 85% of saturation at amibent temperature. Thus, where the room temperature saturation of hydrated cadmium nitrate is 58.8%, the preferred maximum concentration would be 0.9×58.8 or 53% or advantageously, the more preferred concentration should not exceed 0.85×58.8% or 50%. However, at 95% concentration, the maximum may be 0.95×58.8 or 56%. Stating it broadly, the method comprises immersing a porous nickel plaque in a hot aqueous solution of cadmium nitrate unsautrated at room temperature and containing a wetting agent capable of volatilizing during drying at a temperature below the melting point of the cadmium nitrate, whereby to impregnate the plaque with the solution; removing the plaque from the solution and drying it at an elevated temperature below the melting point of the cadmium nitrate; rapidly immersing the dried plaque in a solution containing up to about 50% by weight of alkali metal hydroxide, e.g. 20% to 35%, to convert the cadmium nitrate salt to porous cadmium hydroxide and removing the plaque from the hydroxide solution followed by washing said plaque in hot water. Depending upon the weight increase desired in the plaque, the foregoing steps are repeated until the desired weight increase is obtained.

Generally speaking, the weight increase of the plaque due to the contained cadmium hydroxide should be at least 50% and range up to about 100% or more. Thus, the new process relies on the fact that a porous nickel matrix or plaque can be filled with cadmium hydroxide merely by employing a series of impregnating cycles in each of which the plaque is first immersed in an aqueous solution of cadmium nitrate, to which a wetting agent has been added, the plaque then removed and dried, and the hydrated nitrate converted to hydroxide. The wetting agent is easily removed during drying so long as it is capable of volatilizing at a temperature below the melting point of the hydrated cadmium nitrate.

One embodiment of my invention which, for convenience, is referred to as a two-step process comprises dipping the electrode blank or plaque in a hot solution of cadmium nitrate, followed by drying at a temperature below the melting point of the hydrated cadmium nitrate (below 55° C.) and then dipping in hot caustic solution to convert the cadmium nitrate to the hydroxide, and then washing, the steps being repeated until the desired amount of active material is obtained.

Another embodiment which I have found advantageous in preparing electrode plates of varying thicknesses which, for convenience, is referred to as a three-step process, comprises taking the blank containing the dried hydrated cadmium nitrate and dipping it in cold caustic solution followed by dipping in hot caustic solution (e.g. boiling) and then washing in water. The foregoing steps are repeated until a desired amount of cadmium hydroxide is obtained, following which the washed and dried electrode blank is given a supplementary dip in a cadmium nitrate solution of preferably lower concentration. The electrode blank is then dried at a temperature above the melting point of the hydrated cadmium nitrate and the thus dried electrode is then dipped in the caustic solution, (for example, boiling solution) such as approximately 20% by weight of KOH, to convert the supplemental hydrated cadmium nitrate to cadmium hydroxide. I have found that the supplementary dip and subsequent treatment are advantageous in preventing the cadmium hydroxide from extruding or exuding out of the pores of the plate during use in a cell.

However, in using the so-called two-step process described earlier in achieving a high leading of cadmium hydroxide in the porous plaque, care must be taken to avoid undesirable extrusion or exudation of the hydroxide material from the final electrode, mainly in the discharging processes, particularly where gassing is allowed to occur. Apparently, the finally produced electrode is found to contain some particles that are only loosely bound to the mass and which may emerge from it during degassing. One aspect of the invention resides in avoiding the foregoing phenomenon by rapidly immersing the impregnated electrode blank or plaque into a 25% to 50% solution of potassium hydroxide maintained at a controlled temperature below the boiling point of the solution.

Tests have shown that favorable results are obtained when the cadmium nitrate impregnated plaque is dipped rapidly in a KOH solution at a rate of 2 or 3 inches per second at a solution temperature of 70° to 80° C. Indications are that if an electrode blank or plaque is only gradually immersed in the KOH solution, the ampere hour capacity of the resulting electrode is reduced and the discharge characteristics adversely affected, apparently due to reduced porosity of the electrode.

For example, if a cadmium nitrate impregnated plaque is only partially entered into the KOH solution, the capillary flow of solution into the non-immersed portion is rapid, whereby the amount of KOH resulting from capillary flow will tend to be less so that the resulting electrode will have non-uniform characteristics and properties due to residual unreacted cadmium nitrate which tends to dissolve and re-precipitate in undesirable locations.

However, by rapidly wholly immersing the electrode blank or plaque into the KOH solution at a rate equal to or greater than the capillary flow rate to the part not yet immersed, subsequent exudation of the active material in the final electrode is largely minimized.

As stated in broadly describing the so-called three-step process, the desired properties are obtained by carrying out the supplementary impregnation dip into a cadmium nitrate solution of reduced concentration containing, for example, 15% to 30% by weight of the hydrated cadmium nitrate and then heating the electrode plaque to a drying temperature above the melting point of hydrate cadmium nitrate, e.g. 70° C., followed by dipping in boiling 25% KOH solution to convert the cadmium nitrate to cadmium hydroxide. The melting of the cadmium nitrate after subsequent dips in KOH solution does not present a problem since the melted nitrate forms only a thin coating around previously produced cadmium hydroxide which cadmium nitrate is easily converted to cadmium hydroxide by the KOH without adverse affects.

By using the two methods described hereinbefore, high permeability is preserved within the electrode without substantially lowering overall porosity coupled with exceptionally favorable discharge characteristics, while minimizing undesirable loss of active material by extrusion or exudation during the charging and discharging process of the battery containing the improved electrode.

Referring now to FIG. 1, a plan view of an electrode blank 10 is shown produced from sintered carbonyl nickel powder, the blank in this instance comprising a layer of nickel powder sintered to each side of a nickel mesh screen or grid 11, although the screen need not necessarily be used as part of the electrode structure. The marginal edge of the blank 12 is compressed to a very high density to provide a desired amount of rigidity to the electrode blank, while a compacted corner zone 13 is provided for attaching electrode leads.

The prepared electrode blanks or plaques are mounted in a suitable carrier, such as for example, electrode carrier assembly 14 formed of nickel comprising a rack 15 having bent end portions or legs 16, 17 and 18 by means of which the carrier is supported across the lips of a beaker or container 35 as shown in FIG. 5 and a pair of transverse wings 19, 20. Extending at right angles from wings 19, 20 are a pair of side rack members 21, 22 (FIG. 3) and corresponding side rack members (not visible) on the other side of rack 15, such as 21A (FIG. 4), the ends of the side rack members as shown in FIG. 3 being connected to cross members 23, 24. Passing through wings 19, 20, to cross members 23, 24 are spacer rods 19A, 20A between which electrode plaques 10 are supported, the ends of the plaques being indexed against rods 25, 26 (FIG. 3) which connects between side rack members, for example note rod 25, supported between rack side members 21, 21A in FIG. 4. The plaques are inserted between the spacer rods at a spacing of about one-sixteenth to three-thirty-secondths of an inch, with the assembled plaques confined between side elements 27, 28, 29 and 30 (note FIG. 4), through the ends of which elements pass rods 31, 32 and rods 33 and 34, whereby the assembled plaques are capable of being supported within a beaker 35 across the lips thereof using support inserts 37, 38 which fit over legs 16, 17 and 18. A handle 36 is connected to the rack to facilitate raising and lowering the carrier into the solution in the beaker.

In carrying out the process of the invention, a group of electrode blanks 10 (FIG. 1) about 1⅞" x 2 3/16" and 0.03" thick of porous nickel of about 85% porosity reinforced with a nickel mesh screen, or perforated, or expanded nickel sheet, are first mounted in carrier assembly 14 as shown in FIGS. 2 to 4. An impregnation solution is prepared containing about 1.8 parts by weight of $Cd(NO_3)_2 \cdot 4H_2O$, about 0.2 part by weight of N-propanol as a wetting agent and 1.2 parts by weight of water to provide a concentration of the hydrated cadmium nitrate at ambient temperature of about 56.5% by weight 58% to 60% concentration by weight being substantially the saturation limit of the solution at ambient temperature.

Figure 6:
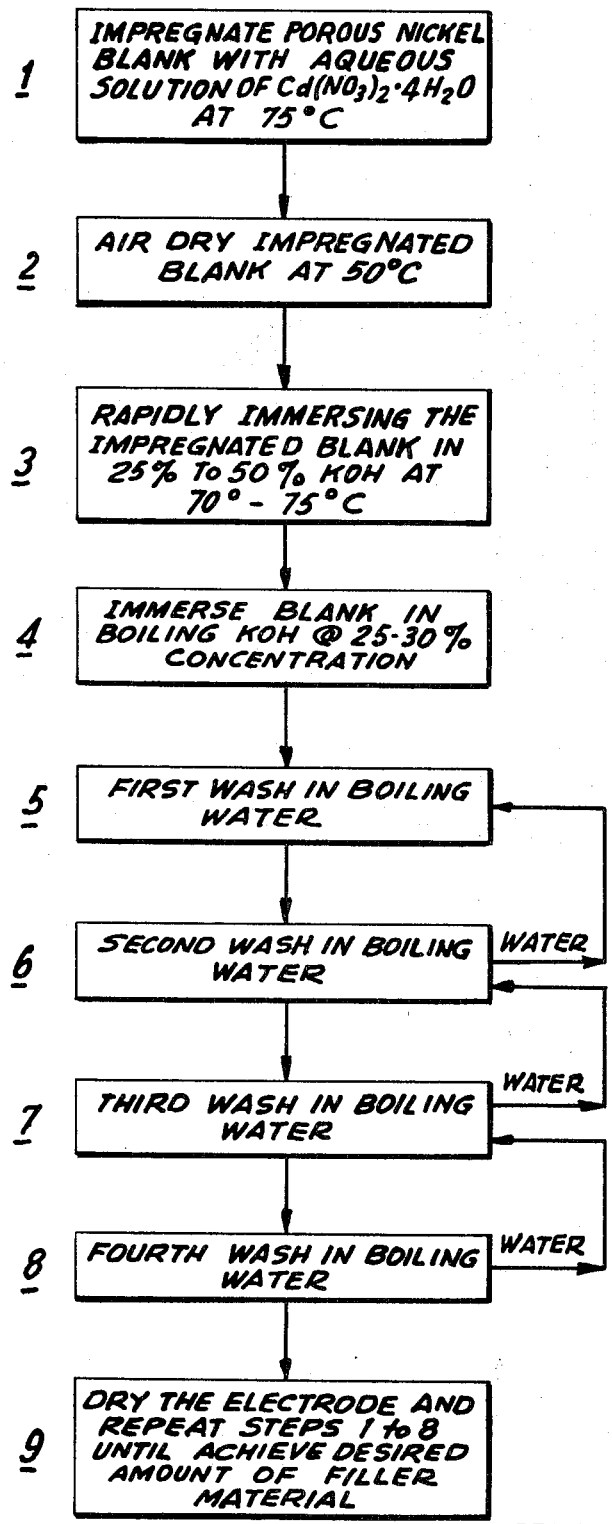
FIG. 6 is a flow sheet outlining one embodiment of a preferred group of steps in carrying out the process of the invention.

The steps employed in a preferred embodiment of the invention are illustrated in the flow sheet of FIG. 6. The assembled blanks are immersed for two minutes in the beaker (step 1) maintained at a temperature of about 75° C., following which the electrode carrier is lifted from the solution, allowed to drip briefly and then dried in a drying chamber (step 2) at a temperature below the melting point of the hydrated cadmium nitrate, that is, in hot circulating air maintained at a temperature of 50° C.

Next, the carrier is immediately immersed into a beaker of 25% to 50% aqueous solution of KOH maintained at a temperature of 75° to 80° C. (step 3) and held there for about 15 minutes, followed by an equal period in the same concentration of KOH (step 4) maintained at its boiling temperature. Following the precipitation of the active material, the electrode blank is subjected to a series of washing steps in boiling hot water, for example, four washes at 20 minutes each (steps 5 to 8), the washes being preferably carried out in distilled or demineralized water free from organic impurities. Where large amounts of water are employed, the last wash can be used for the next to the last wash and so on as depicted in FIG. 6. As will be apparent to one skilled in the art, a similar flow sheet can be employed with slight modification in carrying out the three-step process.

Following the aforementioned washes, the electrode carrier assembly is then subjected to air drying in an air drier maintained at 100°–120° C. to complete what is referred to as a one dip cycle. Laboratory tests using N-propyl alcohol as the wetting agent have indicated that seven dip cycles, that is, repeating the cycle depicted, for example in FIG. 6, seven times, appeared to yield the desired amount of active material, cadmium hydroxide, in the electrode. Other aliphatic alcohols that may be employed, provided they volatilize easily at a temperature below the melting point of nickel nitrate, include those ranging from ethyl to butyl alcohol. Other wetting agents include soluble ketones (acetone) or other water soluble compounds having the volatility characteristics defined above.

Since the electrode carrier assembly need only be loaded and unloaded once to accomplish the repeated cyclic treatment depicted by FIG. 6, although the treatment may be varied so long as the drying temperature following the initial impregnation of nickel nitrate is maintained below the melting point of the hydrated nitrate salt, the mechanical ease with which the electrodes can be handled renders the process particularly applicable to automation.

Porous electrodes produced in accordance with the invention measuring 1⅞" x 2 3/16" and about 0.03" thick were tested as negative electrodes in a cell using nickel positive electrodes produced using substantially the same method of the invention using hydrated nickel nitrate as the impregnating salt, the cell being constructed with commercial separators, with the cell exhibiting favorable discharge characteristics. For example, a voltage above 1 volt for a 6 minute discharge rate was maintained for 70% of the one hour ampere hour capacity.

As has been stated hereinbefore, it is desirable that the concentration of the cadmium nitrate impregnation solution not exceed its room temperature saturation limit, that is, should not exceed about 58–60% by weight of solution. Likewise, the concentration of the alkaline solution preferably may range up to about 50%, and advantageous range being about 20% to 35% by weight of alkali metal hydroxide (sodium or potassium hydroxide).

The two preferred embodiments of the invention differ from each other in the manner of stabilization of the porous active hydroxide obtained by precipitation from hydrated nitrate salt dried below its melting point. In the so-called two-step process, the stabilization is obtained by controlling the temperature of the alkaline hydroxide solution. In the so-called three-step process, the stabilization is a separate cementing step. Both of these methods can be considered to be mechanical in nature, so far as their result is concerned. Other methods of mechanical stabilization are feasible such as: surface compression by using a small roller, electroplating, partial solvation as with ammonia and re-precipitation.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of producing improved negative nickel electrodes for nickel-cadmium batteries which comprises, immersing a sintered porous nickel plaque in a hot aqueous solution of hydrated cadmium nitrate containing a wetting agent, which solution at ambient temperature is unsaturated and does not exceed 56% by weight of hydrated cadmium nitrate, whereby to impregnate said plaque with said solution, removing the plaque from said solution and drying it at an elevated temperature below 55° C. which is below the temperature at which the cadmium nitrate melts, and rapidly immersing wholly at a rate equal to or greater than the capillary flow rate to the part not yet immersed said dried plaque in a hot alkaline solution containing up to about 50% by weight of an alkali metal hydroxide at least sufficient to effect complete conversion of said cadmium nitrate to cadmium hydroxide.

2. The method of claim 1, wherein the alkaline solution contains about 20% to 35% by weight of KOH, and wherein following the treatment in the alkaline solution, the porous plaque is washed in hot water.

3. The method of claim 2, wherein the alkaline solution is heated to a temperature of about 70° to 80° C.

4. The method of claim 2, wherein the cycle of impregnation with cadmium nitrate, of converting the impregnated salt to cadmium hydroxide and of then washing the plaque is repeated a number of times until the desired amount of cadmium hydroxide is produced within the plaque.

5. The method of claim 1, wherein the plaque is immersed in the alkaline solution at a rapid rate of at least 2 inches per second to insure uniform conversion of the cadmium nitrate to cadmium hydroxide.

6. A method of producing improved negative nickel electrodes for nickel-cadmium batteries which comprises, immersing a sintered porous nickel plaque in a hot aqueous solution of cadmium nitrate containing a wetting agent, which solution at ambient temperature is unsaturated and does not exceed 56% by weight of hydrated cadmium nitrate, whereby to impregnate said plaque with said solution, removing the plaque from said solution and drying it at an elevated temperature below 55° C. which is below the temperature at which the hydrated cadmium nitrate melts, immersing said plaque in an alkaline solution containing up to about 50% by weight of an alkali metal hydroxide at least sufficient to effect complete conversion of the hydrated cadmium nitrate to cadmium hydroxide, then immersing said treated plaque in a hot alkaline solution of alkali metal hydroxide, washing and drying said plaque, repeating the foregoing steps until a desired amount of cadmium hydroxide has been produced, subjecting said plaque with the desired amount of cadmium hydroxide to a supplementary dip in a cadmium nitrate solution, drying said plaque at a temperature above the melting point of hydrated cadmium nitrate, dipping said plaque in alkaline solution containing alkali metal hydroxide at least sufficient to effect complete conversion of said supplementary hydrated cadmium nitrate to cadmium hydroxide, followed by washing in hot water, and then drying.

7. The method of claim 6, wherein the concentration of the cadmium nitrate solution employed in the supplementary dip ranges from about 15% to 30% by weight of solution.

8. A method of producing improved negative nickel electrodes for nickel-cadmium batteries which comprises, supporting in spaced relation a plurality of sintered porous nickel plaques in an electrode carrier assembly, immersing said assembly in a hot aqueous solution of cadium nitrate containing a wetting agent, which solution at ambient temperature is unsaturated and does not exceed 56% by weight of hydrated cadmium nitrate, whereby to impregnate said plaques with said solution, removing said assembly of plaques from said solution and subjecting said assembly of plaques to drying at an elevated temperature below 55° C. which is below the temperature at which the hydrated cadmium nitrate melts, and rapidly immersing wholly at a rate equal to or greater than the capillary flow rate to the part not yet immersed said assembly of plaques in a hot alkaline solution containing up to about 50% by weight of an alkali metal hydroxide at least sufficient to effect complete conversion of said cadmium nitrate to cadmium hydroxide in each of said plaques.

9. The method of claim 8, wherein the alkaline solution contains about 20% to 35% by weight of KOH, and wherein following the treatment in the alkaline solution, the assembly of plaques is washed in hot water.

10. The method of claim 9, wherein the alkaline solution is heated to a temperature of about 70° to 80° C.

11. The method of claim 9, wherein the cycle of impregnation with cadmium nitrate, of converting the impregnated salt to cadmium hydroxide and of then washing the plaques are repeated a number of times until the desired amount of cadmium hydroxide is produced within each plaque without removing the plaques from the assembly.

12. The method of claim 8, wherein the plaques are immersed in the alkaline solution at a rapid rate of at least 2 inches per second to insure uniform conversion of the cadmium nitrate to cadmium hydroxide.

13. A method of producing improved negative nickel electrodes for nickel-cadmium batteries which comprises, supporting in spaced relation a plurality of sintered porous nickel plaques in an electrode carrier assembly, immersing said assembly in a hot aqueous solution of cadmium nitrate containing a wetting agent, which solution at ambient temperature is unsaturated and does not exceed 56% by weight of hydrated cadmium nitrate, whereby to impregnate said plaques with said solution, removing said assembly of plaques from said solution and subjecting said assembly of plaques to drying at an elevated temperature below 55° C. which is below the temperature at which the hydrated cadmium nitrate melts, immersing said assembly of plaques in an alkaline solution containing up to about 50% by weight of an alkali metal hydroxide at least sufficient to effect complete conversion of the hydrated cadmium nitrate to cadmium hydroxide, then immersing said assembly of treated plaques in a hot alkaline solution of alkali metal hydroxide, washing and drying said assembly of plaques, repeating the foregoing steps without removing the plaques from the assembly until a desired amount of cadmium hydroxide has been produced, subjecting said assembly of plaques with the desired amount of cadmium hydroxide to a supplementary dip in a cadmium nitrate solution, drying said assembly of plaques at a temperature above the melting point of hydrated cadmium nitrate, dipping said assembly of plaques in alkaline solution containing alkali metal hydroxide at least sufficient to effect complete conversion of said supplementary hydrated cadmium nitrate to cadmium hydroxide, followed by washing in hot water, and then drying.

14. The method of claim 13, wherein the concentration of the cadmium nitrate solution employed in the supplementary dip ranges from about 15% to 30% by weight of solution.

References Cited

UNITED STATES PATENTS

| | | | |
|---|---|---|---|
| 2,675,418 | 4/1954 | Nichols | 136—28.11 |
| 3,248,266 | 4/1966 | Rampel | 136—29 |
| 3,288,643 | 11/1966 | Stark | 136—24 |
| 3,352,719 | 11/1967 | Schneider | 136—29 |

WINSTON A. DOUGLAS, Primary Examiner

C. F. LeFEVOUR, Assistant Examiner

U.S. Cl. X.R.

136—120, 29, 28